(12) United States Patent
Howse

(10) Patent No.: US 7,076,914 B1
(45) Date of Patent: Jul. 18, 2006

(54) INSECT CONTROL DEVICE

(75) Inventor: Philip Edwin Howse, Gosport (GB)

(73) Assignee: Exosect Limited, Winchester (GB)

( * ) Notice: Subject to any disclaimer, the term of this patent is extended or adjusted under 35 U.S.C. 154(b) by 0 days.

(21) Appl. No.: 10/111,146

(22) PCT Filed: Oct. 20, 2000

(86) PCT No.: PCT/GB00/04048

§ 371 (c)(1),
(2), (4) Date: Apr. 19, 2002

(87) PCT Pub. No.: WO01/28322

PCT Pub. Date: Apr. 26, 2001

(30) Foreign Application Priority Data

Oct. 20, 1999 (GB) .................................. 9924772.8

(51) Int. Cl.
*A01M 25/00* (2006.01)

(52) U.S. Cl. ..................... 43/132.1; 43/124; 43/131

(58) Field of Classification Search .................. 43/107, 43/114, 124, 131, 132.1
See application file for complete search history.

(56) References Cited

U.S. PATENT DOCUMENTS

| 1,857,890 | A | * | 5/1932 | Sullivan | 43/107 |
| 3,685,199 | A | * | 8/1972 | Bradshaw | 43/114 |
| 3,835,578 | A | * | 9/1974 | Basile | 43/132.1 |
| 3,968,590 | A | * | 7/1976 | Kitterman | 43/114 |
| 4,133,137 | A | * | 1/1979 | van Adelsberg | 43/114 |
| 4,425,731 | A | * | 1/1984 | Orlando | 43/58 |
| 4,793,474 | A | * | 12/1988 | Drake | 206/0.5 |
| 4,947,578 | A | * | 8/1990 | Anderson et al. | 43/131 |
| 5,027,548 | A | * | 7/1991 | Anderson | 43/131 |
| 5,518,719 | A | * | 5/1996 | Blum | 424/84 |
| 5,548,922 | A | * | 8/1996 | Wefler | 43/131 |
| 5,771,628 | A | * | 6/1998 | Nobbs | 43/121 |
| 5,813,165 | A | * | 9/1998 | Dougherty, Sr. | 43/58 |
| 6,041,543 | A | * | 3/2000 | Howse | 43/132.1 |
| 6,202,342 | B1 | * | 3/2001 | Edwards | 43/132.1 |
| 6,221,375 | B1 | * | 4/2001 | Howse | 424/417 |
| 6,339,897 | B1 | * | 1/2002 | Hayes et al. | 43/132.1 |
| 6,393,760 | B1 | * | 5/2002 | Lingren | 43/122 |
| 6,505,434 | B1 | * | 1/2003 | Kloczko et al. | 43/114 |

FOREIGN PATENT DOCUMENTS

| GB | 2115697 | * | 9/1983 |
| WO | WO 95/34200 | * | 12/1995 |
| WO | WO 99/59403 | * | 11/1999 |
| WO | WO 99/60848 | * | 12/1999 |

* cited by examiner

Primary Examiner—Peter M. Poon
Assistant Examiner—David J. Parsley
(74) Attorney, Agent, or Firm—Gary M. Hartman; Domenica N. S. Hartman; Hartman & Hartman

(57) ABSTRACT

A pest control device and a method of deploying the device. The device comprises a housing provided with at least one opening which is closed or sealed by a material arranged to degrade in an environment in which the device is located, thereby allowing eventual access to the interior of the device. The method comprises providing the device with the temporarily sealed or closed opening(s), a pest behavior-modifying agent located in the interior of the device housing, and a feature for causing oscillatory motion of the housing while in free-fall motion. The device is then caused to fall from a height into or on to an area in which pest control is desired.

6 Claims, 2 Drawing Sheets

INSECT CONTROL DEVICE

CROSS REFERENCE TO RELATED APPLICATIONS

This application claims the benefit of International Application No. PCT/GB00/04048, filed Oct. 20, 2000, published in English as WO 01/28322 A1, and United Kingdom Patent Application No. 9924772.8, filed Oct. 20, 1999.

BACKGROUND OF THE INVENTION (1) Field of the Invention

This invention relates to the control of pests, such as insect pests, and is especially, but not exclusively, related to the control of flying or crawling insect pests.

(2) Description of the Related Art

It has been found that the use of pesticides, pheromones and other pest behaviour modifying agents can lead to many undesirable consequences. For example, the use of pesticide sprays in agricultural and domestic environments has been shown to lead to the development of pesticide resistance in the insect pest species. Such use has also been demonstrated to cause the killing of non-target animals, including beneficial species. Moreover, toxic residues therefrom accumulate in the environment which, subsequently, can be incorporated in the food chain and have consequential harmful effects on animal and human health. Therefore, it is desirable to target the pest species effectively and to minimise the amounts of pesticide which find their way into the environment and/or on to non-target organisms.

International Patent Application No. PCT/GB93/01442 (Publication No. WO 94/00980) discloses a method of accurately targeting pest species, including a method of luring one sex of an insect pest species to a bait using the sexual pheromone of that pest, usually in the form of a volatile attractant, contaminating the attracted insect with electrostatically charged powder or other particulate material formulated with a suitable slow-acting killing agent or behaviour-modifying chemical, and allowing the insect to contaminate the opposite sex of the same species during mating attempts. For this method to operate without harmful consequences, it is desirable that as much powder or other particulate material as possible attaches to the target species and is not lost into the environment where it can affect other organisms.

In many instances, it is desirable to distribute insect traps or baits from the air in order to cover large areas of crop effectively. This is especially suitable when it is desired to control pests of forest trees or pests of large-scale horticulture, or when it is desired to eradicate a pest species in an isolated zone, such as an island. However, when traps or baits in containers are dropped from the air, they lose some of their contents in the fall or by shaking as they land. In many cases it is desirable that the devices anchor in the trees with the openings in a particular orientation. More powder will be lost, and the distribution of the odorous attractant by air currents will be impeded, if the final location of the devices is incorrect.

BRIEF SUMMARY OF THE INVENTION

Accordingly, an object of the present invention is to overcome, or at least substantially reduce, the disadvantages of various methods of mass distribution of insect control devices by providing a method of retaining the powder in the bait or trapping device, and of preventing emission of the odorous attractant until the trap is in its final resting place, for example, after having been dropped from a height. It is a further object to ensure that the openings of a pest control device are in the preferred orientation once it has been delivered to its desired location and that any powder inside the device is primed or charged as a result of the shaking movement which may occur, say, as the device falls under gravity.

A first aspect of the invention provides a pest control device comprising a housing provided with at least one opening which is closed or sealed by a material arranged to degrade in an environment in which the device is located, thereby allowing eventual access to the interior of the device.

The device may comprise two opposed openings each of which may be sealed by a material which is arranged to degrade in the environment in which the device is located, thereby allowing eventual access to the interior of the device. The opposed openings may define opposed ends of a passageway or tunnel through the housing, which may at least partially define the interior of the device.

Preferably the device further comprises a pesticide, pheromone and/or other pest behaviour-modifying agent which may be located in the interior thereof, access thereto being afforded to a pest by environmental degradation of the material. The pesticide, pheromone and/or other pest behaviour-modifying agent may be in the form of a powder which may be electrostatically chargeable and may be chargeable in response to a shaking motion of the device, for example, when falling from a height under gravity to a desired location.

Alternatively, the pesticide, pheromone and/or other pest behaviour-modifying agent may be magnetised.

Alternatively or additionally, the pest behaviour-modifying agent may be associated with a powder, such as a chemically inert powder, which may be electrostatically chargeable, for example, by a shaking motion of the device, or magnetised. The particles of powder may contain or consist of at least one magnetic material and may be associated with the pest behaviour-modifying agent by admixture therewith or by being coated therewith.

With the or each opening initially closed or sealed by the degradable material, the pesticide, pheromone and/or other pest behaviour-modifying agent and, indeed, any pest attractant contained in the device, is prevented from escaping therefrom during such descent or other deployment process.

The pesticide, pheromone or other pest behaviour-modifying agent may be arranged to adhere to a pest which comes into contact therewith or close proximity thereto. The device may further comprise a bait or other attractant, such as a semiochemical, to attract a pest.

The material may be membranous or may include a membrane which may comprise a plastics material, such as a biopolymer, for example, a polyvinyl compound, such as polyvinyl acetate or a polyvinyl alcohol, or a polymer based upon lactic acid. Other suitable degradable materials may comprise carbohydrate-loaded plastics material, such as starch/cellulose-loaded plastics materials which may also be biodegradable. Any other suitable degradable material, for example, a comparatively rapid degradable material may be used. Further, and additionally or alternatively, natural fibre based materials, for example, paper, cotton or linen may be used as the degradable material.

Preferably, and depending upon the conditions of the environment in which the device is located, the material is arranged to degrade within an hour of location of the device in that environment, although it may be arranged to degrade within a week, preferably up to three days, of location of the device in the environment. Such degradation will, of course, usually be dependent upon the environmental conditions to which the device is subjected.

The device may further comprise means arranged to slow the descent of the device when in free-fall, such as, a fin attached to the housing, the fin preferably being arranged to trap air during free-fall of the device and, in so-doing, increases the air pressure to which it is subjected.

The device may, additionally or alternatively, comprise means arranged to secure or anchor the device to a portion of a plant as it descends subsequent to its being dropped from a height above the plant. The anchoring means may comprise a flexible cord or wire of which a proximal end may be attached to the housing and a distal end of which may be attached to a weight.

The fin, in trapping air during free-fall of the device, may be arranged to cause said anchoring means to describe a complex path.

A second aspect of the invention provides a method of controlling a pest comprising:

fabricating a device comprising a housing with at least one opening which is closed or sealed by a material arranged to degrade in an environment in which the device is located, thereby allowing eventual access to the interior of the device in which a pest behaviour-modifying agent is located and means arranged to anchor the device to a portion of a plant as it descends from a height; and deploying the device by dropping it from a height into or on to an area in which pest control is desired.

In this pest control method, the device may be provided in, say, the interior thereof, with a pesticide, pheromone and/or other pest behaviour-modifying agent which is in powder form or is associated with a powder. In either case, the powder may be electrostatically chargeable, for example, by shaking motion of the device during descent thereof, or it may be magnetised, as discussed above in relation to the device of the first aspect of the invention. Also, the degradable material may be selected, either singly or in any combination, from those discussed above in relation to the device of the first aspect of the invention.

Further, the device may be provided with a bait or pest attractant, such as a semiochemical, to attract a pest into the housing of the device where the pest behaviour-modifying agent is contained.

There is provided, by a third aspect of the invention, an air deployable pest control device comprising a housing provided with at least one temporarily sealed or otherwise closed opening, through which, once unsealed a pest can access the interior, a pest behaviour-modifying agent contained within the interior of the housing and means arranged to anchor the device to a portion of a plant with which said means comes into contact during descent of the device from an elevated position.

The opening may be temporarily sealed or otherwise closed by a degradable material. Such a material may be selected from those discussed above in relation to the first and second aspects of the invention.

The device may comprise a bait or other pest attractant, such as a semiochemical, for example a pheromone or para-pheromone, located therein.

The anchoring means may comprise an elongate member, preferably flexible, attached, at one end thereof, to the housing, a distal end thereof preferably being secured to a weight.

The elongate member is preferably attached to the housing at a balance point thereof, such that, in a preferred embodiment, once said anchoring means is secured to a plant, the housing is normally oriented with respect to the vertical.

The device may further comprise means arranged to encourage the device to oscillate during free-fall descent thereof. The oscillation encouraging means may comprise a fin or aerofoil which, as the device falls through the air, is preferably arranged to trap air and, in so-doing, increases the air pressure to which it is subjected, the build-up in air pressure preferably causing said oscillatory motion of the device.

The oscillatory motion of the device may, in use, encourage the anchoring means to describe a complex path during descent.

The pest behaviour-modifying agent may be arranged to adhere to a pest which comes into close or intimate contact therewith and it may be electrostatically chargeable, preferably by virtue of any oscillatory motion during descent. The pest behaviour-modifying agent may be in the form of an electrostatically chargeable powder or may be associated with, by mixing or coating, a powder, preferably a chemically inert powder, which is electrostatically chargeable.

Additionally or alternatively, the pest behaviour-modifying agent may comprise a magnetised powder and/or a sticky surface to which a pest is adherable.

Again, the pest behaviour-modifying agent may be associated with a powder, such as a chemically inert powder, which is magnetised. Such a mixture may comprise particles containing or consisting of at least one magnetic material, such as those disclosed in our co-pending International Patent Application No. PCT/GB99/02090 dated $1^{st}$ Jul. 1999 and published under Serial No. WO 00/01236.

The device may further comprise a bait or a pest attractant, such as, a pheromone or other semiochemical, for example, a para-pheromone.

The anchoring means may be attached to the housing such that, subsequent to the anchoring of the device to a portion of a plant, it depends from said anchoring means such that the at least one opening is preferably beneficially located with respect to attracting a pest.

A fourth aspect of the invention provides an air deployable pest control device comprising a housing with at least one temporarily sealed opening through which, once unsealed, a pest can access the interior of the housing, a pest behaviour-modifying agent contained within the interior of the housing and means arranged to encourage the device to oscillate as it falls through the air.

A fifth aspect of the invention provides a method of deploying a pest control device comprising:

providing a device comprising a housing with a temporarily sealed or otherwise closed opening, a pest behaviour-modifying agent being located in the interior of the housing, and means arranged to cause oscillatory motion of the housing whilst in free-fall motion; and causing the device to fall from a height into or on to an area in which pest control is desired.

In the fourth and fifth aspects of the invention defined above, the opening may be sealed with a degradable material, such as a biodegradable material and/or such materials as those discussed above in relation to the first and second aspects of the invention.

The oscillation encouraging means may comprise a fin or aerofoil which, as the device falls through the air, may be arranged to trap air and, in so-doing, increases the air pressure to which it is subjected, the build-up in air pressure preferably causing said oscillatory motion of the device.

The pest behaviour-modifying agent may be electrostatically chargeable, for example, by virtue of being shaken, such as when the device is undergoing said oscillatory motion.

Additionally or alternatively, the pest behaviour-modifying agent may be associated with a powder, preferably a chemically inert powder, which may be electrostatically chargeable, again by, say, shaking motion of the device, or magnetised. The powder particles with which the pest behaviour-modifying agent is associated, may contain or consist of at least one magnetic material, such as a ferromagnetic material, and may be admixed with or coated by the agent.

An attractant, such as a bait or semiochemical, may be included in the device, to attract pests into the interior thereof, once the temporarily sealed or otherwise closed opening of the device housing has been opened, for example, by degradation.

The device may further comprise means arranged to anchor the housing to a portion of a plant during descent, which means may be arranged to define a complex path during descent of the device. Preferably, the anchoring means comprises an elongate member attached at one end thereof to the housing, its distal end preferably being attached to a weight.

Depending upon the conditions of the environment in which the device is located the degradable seal may be arranged to degrade within an hour of siting the device but it preferably degrades within a week of such siting, more preferably up to three days.

The housing of the device may be biodegradable or otherwise degradable in the environment in which it is located in use.

BRIEF DESCRIPTION OF THE DRAWINGS

In order that the invention may be more fully understood, specific embodiments thereof will now be described by way of example and with reference to the accompanying drawings, in which.

DETAILED DESCRIPTION OF THE INVENTION

Figure 1:
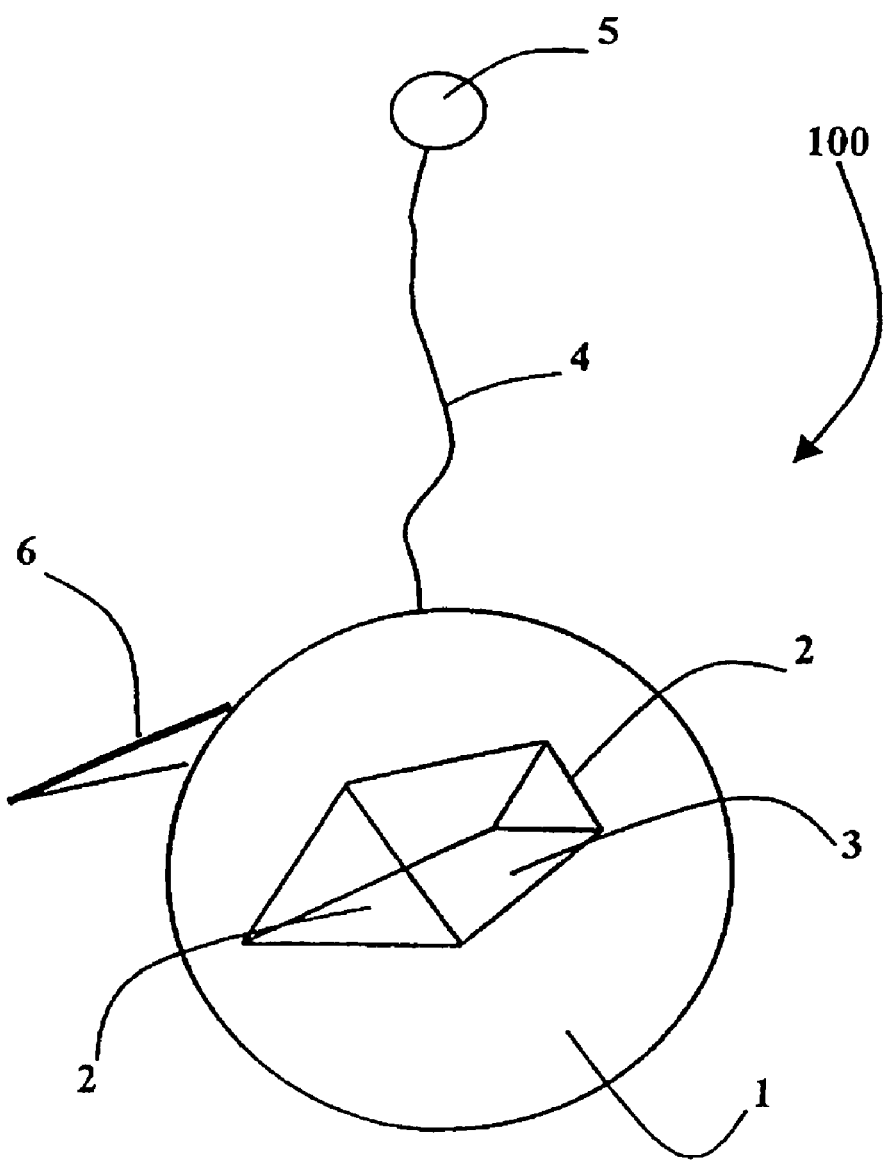
FIG. 1 shows a view of a first embodiment of a device according to the invention.
Figure 2:
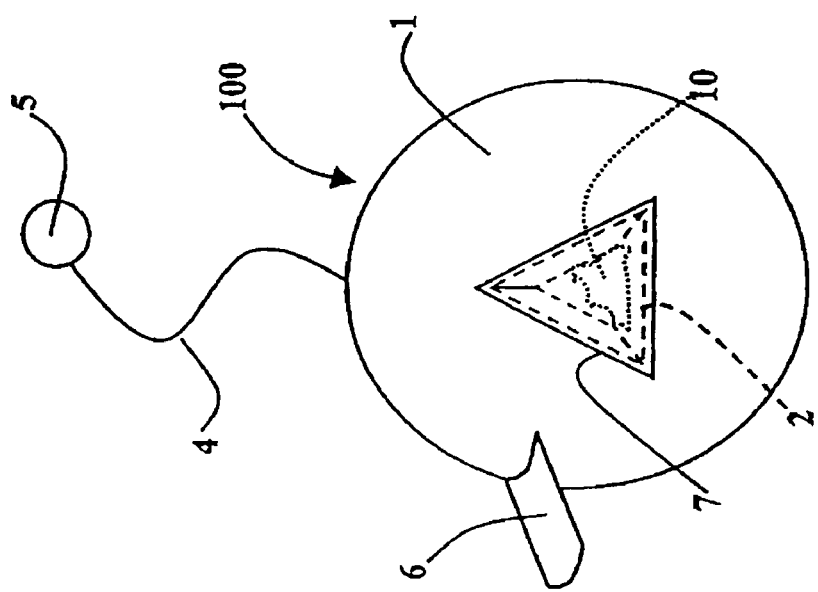
FIG. 2 shows a further view of the embodiment of FIG. 1.

Referring, in the first instance to FIGS. 1 and 2, there is shown an insect control device, generally indicated at 100, which comprises a housing in the form of a hollow sphere 1. The sphere 1 is made of biodegradable plastics material, which will disintegrate after a period of several months. The sphere 1 is provided with diametrically opposed triangular openings 2 into which are fitted the two ends of a tube 3 of triangular cross-section which may be fabricated from cardboard or another suitable biodegradable material. The openings 2 are sealed with thin membranous sheeting 7 of, for example, polyvinyl acetate or a cellulose-loaded plastics material, which is a suitable biodegradable plastics material.

An elongate flexible member 4, such as a fine cord, is attached to the sphere 1 at a point on the vertical axis thereof, such that, when the sphere 1 depends from the member 4, the tube 3 is normally oriented with respect to the axis of dependence. The member 4 is provided with a weight 5 at its distal end, which may be fabricated from wood. In preferred embodiments, the elongate member is in the range of 0.5 to 2.0 m long.

The sphere 1 is provided with a laminar fin or aerofoil 6 extending around at least part of its circumference.

As the device 100 is released from a height in air, air pressure on the fin 6 slows the fall of the sphere 1, causing the weight 5 to rotate around the sphere 1 on the end of the cord 4. Such motion will normally result in the cord 4 catching on to narrow branches of trees or on to other vegetation and wrapping around the branch to anchor the device 100 in position. The motion also causes agitation of any powder 10 in the triangular tube 3, which serves to charge it electrostatically by friction or to increase the level of any existing charge.

As previously stated, air pressure acting upon the fin 6 causes oscillatory motion of the device 100 which causes the weight 5 to describe a complex path. As the cord 4 contacts branches or other parts of plants, the cord 4 is encouraged to wrap around those plant parts, the weight 5 acting like a bolas due to its relatively large moment of inertia. Once the cord 4 has anchored itself to a plant, the sphere 1 will then be suspended from the cord 4 in the preferred orientation.

As a consequence of exposure of the device 100 to high humidity, and/or rain or dew, the plastics membranous sheeting 7 biodegrades within 24 hours, thus providing eventual access for insects attracted by any pheromone or other insect attractant which is in the powder 10 located in the tube 3 and which is thus released. Insects entering the device become contaminated with the electrostatically charged powder 10. Where the powder 10 is formulated with a slow-acting insecticide, insects can leave the device 100 and pass the powder 10 on to others of the same species, so achieving population control. Where the powder 10 is formulated with a pheromone, the contaminated insects are unable to detect natural sources of pheromone emitted by the opposite sex and, as a result, control is achieved by disruption of mating.

In another embodiment of the invention the electrostatically charged or chargeable powder 10 is augmented or substituted by a magnetic powder or a powder which has another kind of adhesive property. With a magnetic powder, which may be chemically inert, it is admixed or otherwise associated with the attractant and/or pesticide or other pest behaviour-modifying agent.

In a further embodiment, the powder 10 is augmented or substituted by a sticky substance coated, for example, on the tube 3, which thereby retains the insects. The device 100 will then function as a monitoring trap for the species responding to the lure or other attractant therein.

It will be evident to those skilled in the art that the sphere 1 may be made of a variety of materials and substituted by a variety of shapes to achieve the same end. For example the cover may be hemispherical, polyhedral, X-shaped, etc.

Figure 3:
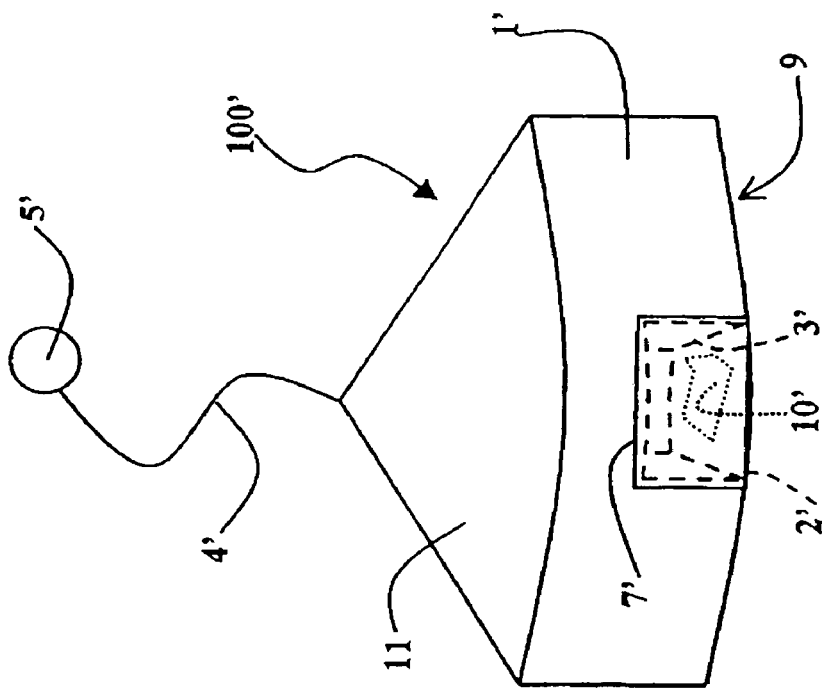
FIG. 3 shows a second embodiment of the device according to the invention.

Indeed, and as shown in FIG. 3, a second embodiment of insect control device 100' is provided with a cylindrical housing 1' which has a conical roof portion 11. An elongate member 4' is connected to the roof 11 at the apex thereof, such that, when depending from the member 4', the housing 1' is normally oriented.

The housing 1' is provided with diametrically opposed openings 2' between which a passage or tunnel 3' extends. Within the tunnel 3', there is located a pest behaviour-modifying agent 10' such as a pesticide, pheromone source, adhesive surface or a combination thereof.

Initially, and in accordance with the inventive device 100 of FIGS. 1 and 2, the openings 2' are temporarily sealed or otherwise closed. Preferably, such sealing is effected by a biodegradable membranous material 7' which, consequential to the action of the environment in which the device 100' is located in use, degrades to allow access to the tube 3'. Once the pest has gained access to the tube 3', it is subjected to the pest behaviour-modifying agent 10'.

In a similar fashion to the above-described device 100, the pest behaviour-modifying agent 10' of the device 100' may comprise an electrostatically chargeable, chemically inert powder which is mixed or otherwise associated with the agent 10' and which may be charged by friction upon being subjected to shaking or other motions. Also, any attractant, such a pheromone, para-pheromone or other semiochemical, may be mixed of otherwise associated with the electrostatically-chargeable powder. Additionally or alternatively, the powder may be magnetised.

The device 100' is provided with a substantially flat base 9 which, as the device is falling from a height, causes the housing 1' to oscillate in the air. Such motion causes the powder 10' to become charged electrostatically and also encourages a weight 5', attached to the distal end of an elongate member 4', to describe a complex path. Once the elongate member 4', such as a fine cord or flexible wire, comes into contact with a portion of a plant, it tends to wrap therearound, the weight 5' acting as a bolas, thereby anchoring the device 100' to the plant. As the cord 4' is attached to the apex of the roof 11, the housing 1' depends therefrom, in a normal orientation, thereby orienting the openings 2' in the desired position to attract the target species.

Obviously, in either device 100, 100' the openings may be distributed about the housing 1, 1' such that they preferentially attract a particular target species. For example, for certain flying or crawling insect pests, vertically oriented openings may be beneficial.

It is to be appreciated that certain features of the invention which are, for clarity, described in the context of separate embodiments may also be provided in combination in a single embodiment. Conversely, various features of the invention which are, for brevity, described in the context of a single embodiment, may also be provided separately or in any suitable subcombination. It is understood that the ambit of the invention is not limited to the particular embodiments but is to be determined by the scope of the appended claims.

The invention claimed is:

1. An insect pest control device comprising:

a degradable housing defining a hollow interior, at least one opening in the housing through which pests can enter the hollow interior of the housing, a degradable closing material that closes the at least one opening so as to enclose but not fill the hollow interior, and a pest behavior-modifying agent contained within the hollow interior of the housing and protected by the housing from an environment in which the housing is located, the hollow interior being only partially filled so that both the pests and the pest behavior-modifying agent are capable of being simultaneously accommodated within the hollow interior, means for securing the device to a portion of a plant, and aerofoil means extending directly from the housing for causing the securing means to follow a rotational path around the housing in the event the device falls through the air, wherein the closing material is more rapidly degradable in the environment than the housing, wherein degradation of the closing material exposes the at least one opening to enable the pests to enter into the housing through the at least one opening to access the hollow interior of the housing and the pest behavior-modifying agent which is prevented from escaping the hollow interior by the housing and the closing material and thereafter remains protected within the hollow interior from the environment as a result of the housing more slowly degrading than the closing material, and wherein the housing and the at least one opening are not configured as a trap but instead are configured so that pests that enter the hollow interior are also able to freely leave the hollow interior through the at least one opening.

2. A device according to claim 1, wherein the housing is formed of a biodegradable material so as to disintegrate after a period of several months, and the closing material is formed of a biodegradable material so as to biodegrade within a week.

3. A device according to claim 1, wherein the closing material is a membrane that biodegrades within about twenty-four hours in high humidity, rain, and dew.

4. A method of controlling insect pests in an environment, the method comprising:

fabricating a device comprising a degradable housing defining a hollow interior, at least one opening in the housing through which pests can enter the hollow interior of the housing, a degradable closing material that closes the at least one opening so as to enclose but not fill the hollow interior, and a pest behavior-modifying agent contained within the hollow interior of the housing so that the hollow interior is only partially filled and both the pests and the pest behavior-modifying agent are capable of being simultaneously accommodated within the hollow interior, the closing material being more rapidly degradable in the environment than the housing thereby allowing eventual access by the pests to the hollow interior of the housing in which the pest behavior-modifying agent is contained and remains protected from the environment as a result of the housing being more slowly degradable in the environment than the closing material, the housing further comprising means for securing the device to a portion of a plant and aerofoil means extending directly from the housing for causing the securing means to follow a rotational path around the housing while free-falling; and deploying the device by placing the device in the environment in which control of the pests is desired, the deploying step comprising causing the device to free-fall from a height into the environment, the causing means inducing rotational motion of the securing means around the housing during free-fall to cause the securing means to secure the device to a portion of a plant, and allowing the closing material to degrade after which the pests enter the hollow interior of the housing through the at least one opening, access the pest behavior-modifying agent which is prevented from escaping the hollow interior during the deploying step by the housing and the closing material and thereafter remains protected within the hollow interior from the environment by the housing, and then leave the housing through the at least one opening;

wherein the housing and the at least one opening do not operate as a trap but instead operate so that pests that enter the hollow interior are also able to freely leave the hollow interior through the at least one opening.

5. A method according to claim 4, wherein the pest behavior-modifying agent is associated with an electrostatically chargeable powder, the powder being contained within the hollow interior of the housing so that the powder becomes electrostatically charged during the deploying step.

6. A method according to claim 4, wherein the housing is formed of a biodegradable material so as to disintegrate after a period of several months in the environment, and the closing material is a biodegradable material so as to biodegrade within a week in the environment.

* * * * *